Patented Dec. 19, 1950

2,534,374

UNITED STATES PATENT OFFICE 2,534,374

CREAMING OF NATURAL RUBBER LATEX

John S. Rumbold, Woodbridge, Conn., assignor to United States Rubber Company, New York, N. Y., a corporation of New Jersey No Drawing. Application December 29, 1948, Serial No. 68,039

10 Claims. (Cl. 260—822)

This invention relates to improvements in concentrating natural rubber latex, more particularly concentrating formaldehyde treated natural rubber latex by creaming with hydrophilic colloidal creaming agent.

Natural rubber latex preserved with formaldehyde, or preserved by the addition to the fresh latex of formaldehyde followed shortly by the further addition of an alkaline material such as ammonia (U. S. Patent 1,872,161) has the disadvantage that it cannot be concentrated by chemical creaming with a conventional hydrophilic colloidal creaming agent to as high a cream solids concentration as latex preserved only with ammonia or other alkaline material. The terms "Hevea latex," "natural rubber latex" and "latex" are used herein to designate the latex of the *Hevea brasiliensis* tree.

According to the present invention, the creaming rate and the cream solids concentration of a chemically creamed natural rubber latex to which formaldehyde has been added, is considerably increased by the further addition to the latex of a condensation product of formaldehyde with an alkali-metal salt of an aryl sulfonic acid.

In carrying out the present invention, the condensation product of formaldehyde with an alkali-metal salt of an aryl sulfonic acid may in general be added to the fresh latex prior to the addition of the formaldehyde, at the same time or admixed with the formaldehyde, or subsequent to the addition of the formaldehyde. The formaldehyde should, of course, be added as soon after tapping as practicable to suppress the undesirable natural enzyme activity. It is desirable also to add the condensation product of formaldehyde with an alkali-metal salt of an aryl sulfonic acid as soon after tapping as practicable since its addition to the latex after the addition of the formaldehyde appears to give a decreasing improvement in the creaming rate with increasing intervals between such additions. In that the condensation product of formaldehyde with an alkali-metal salt of an aryl sulfonic acid does not suppress the enzyme activity in the latex which would be suppressed with formaldehyde, it is preferable to add the condensation product of formaldehyde with an alkali-metal salt of an aryl sulfonic acid at the same time or admixed with the formaldehyde, and as soon after tapping as practicable. The pH of freshly tapped latex is about 7, and on addition of the formaldehyde, drops on standing generally to 5.5 to 6.8, some of the formaldehyde becoming combined with rubber. The thus treated latex may be creamed with a hydrophilic colloidal creaming agent at such a pH between 5.5 and 6.8, but it is preferable to raise the pH to above 8, before or after the creaming, by the addition of an excess of ammonia over that necessary to react with the free formaldehyde (i. e. the formaldehyde not combined with the rubber) to form hexamethylene tetramine. This prevents thickening of the cream and ultimate coagulation. Primary amines, such as monomethylamine and monoethylamine, which act similarly to ammonia in that they remove free formaldehyde from the latex, may also be used to raise the pH of the latex to above 8. It has been found that where the ammonia is added to the formaldehyde treated latex to raise the pH to above 8 before creaming, a further increase in the creaming rate results. The ammonia addition in such case should generally be made within three days of the formaldehyde addition to prevent flocculation of the formaldehyde preserved latex on the alkali addition as shown in U. S. Patent 2,327,115. If an excess of ammonia is not added before or after creaming, the latex may be diluted with water before creaming with the hydrophilic colloidal creaming agent, or at some intermediate stage of such creaming, and this will also prevent the thickening and ultimate coagulation of the cream. The amount of such dilution of the latex may be from one to five parts by weight of water for each part of original serum content, preferably one to two parts of water for each part of original serum content, and such dilution should be made whether the latex is creamed from a pH between 5.5 and 6.8, with or without subsequent addition of an alkali which does not react with formaldehyde, such as an alkali-metal hydroxide, or whether the pH of the latex is raised before creaming by the addition of an alkali-metal hydroxide. The amount of formaldehyde addition may be from 0.05% to 1% by weight of the latex, the higher amounts in the range being used where alkali material is not subsequently added to the formaldehyde treated latex, and the lower amount in the range being sufficient where alkali is added to the latex containing the formaldehyde before creaming, or is added to the cream. Paraformaldehyde may be used instead of formaldehyde. The amount of condensation product of formaldehyde with an alkali-metal salt of an aryl sulfonic acid may be from 0.02% to 1% by weight of the latex.

The hydrophilic colloidal creaming agents that may be used in the present invention are those conventionally used in creaming latex, for example, vegetable mucilages, such as alginates, pectates, extracts of the endosperms of leguminous plants belonging to the genera Cassia, Ceratonia, Caesalpinia and Poinciana, mucilages obtained from plants of the genera Astragalus and Acacia, from the seaweed *Chondrus crispus*, and from the stem of the cactus *Opuntia monocantha*, extracts of leaves of *Hibiscus rosasinensis* and of the pods of *Hibiscus esculentus*, extracts of Crocus and Amaryllis bulbs, and of the tubers of

*Amorphophallus variabilis* and *rivieri*, and extracts of the seeds of *Tamarindus indica*, and the like. The amount of hydrophilic colloidal creaming agent is that conventionally used in creaming latex, generally between 0.02 and 0.5% of creaming agent based on the latex.

Other types of known anionic surface-active sulfates and sulfonates are not satisfactory substitutes for, and do not give the improvements in creaming of the condensation product of formaldehyde with an alkali-metal salt of an aryl sulfonic acid in the present invention.

The following examples are illustrative of the invention, all percentages and parts referred to therein being by weight:

Example I

A fresh, unpreserved Hevea latex of total solids content 40% was divided into three equal parts treated as follows:

(1) 10% formaldehyde solution was added to give a formaldehyde concentration of 0.2% based on the latex.
(2) 10% formaldehyde solution containing a condensation product of formaldehyde and sodium naphthalene sulfonate was added in such amount that the concentrations of formaldehyde and the condensation product were both 0.2%, based on the latex.
(3) Preserved only with 1.3% ammonia, based on the latex.

After standing for a few hours to allow the formaldehyde in portions (1) and (2) to complete the sterilization of the latex, the samples were ammoniated so that in each of the three samples the final ammonia concentration was 1.3%. They were then creamed for 2 days with 0.05% ammonium alginate, based on the latex. The latex concentrations were adjusted to 34% total solids before creaming.

Analyses of the cream and serum portions after 2 days' creaming are shown in the following table:

| Sample | Serum Formed | Serum, Total Solids | Cream, Total Solids |
|---|---|---|---|
| | Per cent | Per cent | Per cent |
| 1 | 34.0 | 6.1 | 48.0 |
| 2 | 47.3 | 6.0 | 58.6 |
| 3 | 43.9 | 5.7 | 55.9 |

The condensation product of formaldehyde and sodium naphthalene sulfonate raised the cream solids of the formaldehyde preserved latex from considerably below to above that of the ammonia preserved latex.

Example II

A fresh, unpreserved latex of total solids content 39.6% was divided into 7 equal samples. Sample (1) was treated with 0.2% formaldehyde, followed a few hours later by ammoniation to 1%, that is, by addition of ammonia in amount to give 1% excess of the ammonia required to combine with the formaldehyde in the latex. Sample (2) was preserved with 1% ammonia. Samples (3), (4), (5), (6) and (7) were preserved with 0.2% formaldehyde mixed with 0.04%, 0.08%, 0.12%, 0.16%, and 0.19%, respectively, of a condensation product of formaldehyde with sodium naphthalene sulfonate. After a few hours, ammonia was added to samples (3) to (7) in such amount that the final free ammonia content of each sample was 1%. These percentages are all based on the latex.

Samples (1) to (7) were creamed with 0.05% ammonium alginate, based on the latex, the total solids of the samples being adjusted to 34% before creaming.

Analyses of the cream and serum portions after 2 days' creaming are shown in the following table:

| Sample | Serum Formed | Serum, Total Solids | Cream, Total Solids |
|---|---|---|---|
| | Per cent | Per cent | Per cent |
| 1 | 36.1 | 6.4 | 50.2 |
| 2 | 43.5 | 6.1 | 56.1 |
| 3 | 48.1 | 6.8 | 59.8 |
| 4 | 49.2 | 7.6 | 60.3 |
| 5 | 48.4 | 6.7 | 60.3 |
| 6 | 46.6 | 6.5 | 58.8 |

Example III

A fresh latex of total solids 38.7% was divided into 7 equal parts and preserved with 0.2% formaldehyde based on the latex. With the formaldehyde preservative there was added to samples (2), (3), (4), (5), (6) and (7), respectively, 0.02%, 0.05%, 0.10%, 0.20%, and 0.40% of a condensation product of formaldehyde with sodium naphthalene sulfonate.

After standing overnight, the samples were all ammoniated to 1.3% based on the latex, and creamed with 0.05% ammonium alginate based on the latex. The total solids content of each sample as prepared for creaming was 33%.

Analyses of the cream and serum portions after 2 days' creaming are shown in the following table:

| Sample | Serum Formed | Serum, Total Solids | Cream, Total Solids |
|---|---|---|---|
| | Per cent | Per cent | Per cent |
| 1 | 28.9 | 6.13 | 44.4 |
| 2 | 45.5 | 6.76 | 55.6 |
| 3 | 48.5 | 6.82 | 58.4 |
| 4 | 49.0 | 6.80 | 59.0 |
| 5 | 47.0 | 6.49 | 57.2 |
| 6 | 46.8 | 6.23 | 57.1 |
| 7 | 46.9 | 6.35 | 57.4 |

Examples II and III show that only a very small amount of the condensation product of formaldehyde and an alkali-metal aryl sulfonate is necessary to raise the cream solids of the formaldehyde preserved latex.

Example IV

A fresh unpreserved latex of total solids 36.2% was divided into 5 samples treated as follows:

(1) 10% formaldehyde solution was added in such amount that the formaldehyde concentration in the latex was 0.2%.
(2) 1.3% ammonia was added based on the latex.
(3) 1.3% ammonia and 0.2% ammonium oleate was added based on the latex.
(4) and (5) 10% formaldehyde solution containing a condensation product of formaldehyde and sodium naphthalene sulfonate was added in such amount that in each sample the concentrations of formaldehyde was 0.2% and the condensation product was 0.08% based on the latex.

After standing overnight, samples (1), (2), (3) and (4) were ammoniated to a uniform ammonia concentration of 1.3%. Sample (5) was not ammoniated. Samples (1) to (5) were creamed with 0.05% ammonium alginate based on the latex. The total solids content of each sample as prepared for creaming was adjusted to 31.5%.

Analyses of the cream and serum portions after 2 days' creaming are shown in the following table:

| Sample | Latex, pH | Serum Formed | Serum, Total Solids | Cream, Total Solids |
| --- | --- | --- | --- | --- |
|  |  | Per Cent | Per Cent | Per Cent |
| 1 | 10.5 | 39.9 | 6.8 | 48.2 |
| 2 | 10.5 | 47.0 | 6.1 | 54.5 |
| 3 | 10.5 | 51.1 | 6.2 | 58.2 |
| 4 | 10.5 | 53.9 | 7.4 | 59.5 |
| 5 | 6.2 | 48.0 | 6.2 | 54.7 |

These results show that sample (4), preserved with 0.2% formaldehyde and 0.08% of the condensation product, followed by excess of ammonia, creamed in 2 days to a higher concentration than sample (3) preserved with ammonia and ammonium oleate, the ammonium oleate increasing the solids content of the cream from straight ammonia preserved latex in sample (2).

At the end of 21 days samples (3) and (4) each gave creams of 64% solids.

Sample (5), preserved with 0.2% formaldehyde and 0.08% of the condensation product, without subsequent ammonia addition, creamed as well as sample (2), preserved in the ordinary way with ammonia alone.

Example V

A fresh latex of total solids 41.3% was divided into 6 equal parts and preserved with 0.2% formaldehyde based on the latex. 0.3% based on the latex of a condensation product of formaldehyde and sodium naphthalene sulfonate was also added to samples at the times noted in the table below. After 22 hours samples (1) to (6) were ammoniated to 1% and creamed with 0.05% ammonium alginate, based on the latex. The total solids of the samples was adjusted at start of creaming to 35.0%.

Times of addition of the condensation product in samples (1) to (5) and analyses of the cream and serum portions of samples (1) to (6) after 2 days' creaming are shown in the following table:

| Sample | Time of Addition of Condensation Product | Serum Formed | Serum, Total Solids | Cream, Total Solids |
| --- | --- | --- | --- | --- |
|  |  | Percent | Percent | Percent |
| 1 | 15 minutes before Formaldehyde | 44.4 | 7.3 | 57.3 |
| 2 | Mixed with Formaldehyde | 44.2 | 7.2 | 56.9 |
| 3 | 15 minutes after Formaldehyde | 42.7 | 7.0 | 55.8 |
| 4 | 4 hours after Formaldehyde | 39.8 | 7.2 | 53.2 |
| 5 | 20 hours after Formaldehyde | 36.9 | 7.2 | 51.3 |
| 6 | Formaldehyde only | 33.7 | 7.0 | 48.9 |

The above shows that the condensation product of the formaldehyde with the sodium naphthalene sulfonate may be added before, with or after the formaldehyde according to the present invention. Adding the condensation product with the formaldehyde is the present preferred procedure.

Example VI

A fresh latex was divided into 7 equal parts. Sample (1) was preserved with 1.3% ammonia, based on the latex. Samples (2) to (7) were preserved with 0.1% formaldehyde based on the latex. 0.3% based on the latex of a condensation product of formaldehyde with sodium naphthalene sulfonate was added to samples (3) to (7) in admixture with the formaldehyde preservative. Sample (2) containing only formaldehyde was ammoniated to 1.3% based on the latex 20 hours after the formaldehyde addition (U. S. Patent 1,872,161). Samples (3), (4), (5), (6) and (7) were ammoniated to 1.3% based on the latex ¼, 3, 6, 20 and 44 hours after the formaldehyde addition. The samples were creamed for 20 days with 0.05% ammonium alginate based on the latex, the samples being adjusted to 35% total solids before creaming.

Analyses of the cream and serum portions after 20 days' creaming are shown in the following table:

| Sample | Serum, Total Solids | Serum, Total Solids | Cream, Viscosity at 60% T. S. (31° C.) |
| --- | --- | --- | --- |
|  | Per cent | Per cent |  |
| 1 | 7.7 | 62.8 | 40.2 |
| 2 | 7.2 | 60.7 | 52.5 |
| 3 | 7.8 | 63.4 | 42.2 |
| 4 | 7.6 | 63.3 | 38.9 |
| 5 | 7.6 | 63.9 | 40.6 |
| 6 | 7.9 | 64.4 | 39.3 |
| 7 | 7.5 | 64.2 | 41.2 |

It may be seen from the above that the time of addition of alkali to the formaldehyde preserved latex containing the condensation product of formaldehyde with an alkali-metal aryl sulfonate, where it is desired to make the latex alkaline before creaming, may be from a fraction of an hour to many hours after the formaldehyde addition. It may be seen by a comparison of samples (3) to (7) with (2) that the process of the present invention gives creams of higher total solids and lower viscosity than the cream from a formaldehyde-ammonia preserved latex, and by a comparison with sample (1) that the process of the present invention gives creams comparable to the cream from a straight ammonia preserved latex after extended creaming.

Example VII

To one sample of a fresh unpreserved latex of 40% total solids was added 0.2% formaldehyde based on the water content and to a second sample was added 1.5% formaldehyde based on the water content. To each sample was added 0.4% condensation product of formaldehyde with sodium naphthalene sulfonate based on the total latex and 0.08% ammonium alginate based on the water content. With the necessary water for the above additions, the original latex serum was diluted about 0.1 part per part of original latex serum, the latices being thus creamed from about 38% total solids. The second sample was allowed to cream 20 days.

At the end of 2 days' creaming, the cream of the first sample (55% total solids) was separated from the serum, diluted to 20% solids with adjustment of the formaldehyde content to 1.5%, and the ammonium alginate content to 0.08%, both based on the water content of the diluted latex. The addition of water to the cream gave a dilution of 4.3 parts of water for each part of original latex serum. The diluted cream was allowed to recream 18 more days.

At the end of the 20 day creaming period, the first sample had a 53.8% solids cream, a pH of 5.3, and a viscosity of 37 centipoises, whereas the second sample had a 53.1% solids cream of a pH of 5.5, but the cream was too thick to measure the viscosity. At the end of 8 more days, the cream of the second sample had coagulated, whereas at the end of 31 more days, the cream of the first sample had a viscosity of 34 centipoises. (Viscosity measurement in this and the other examples were made at 27° C.).

It may be seen from the above that where an excess ammonia is not added before or after the creaming, dilution of the latex during the creaming operation prevents thickening of the cream with ultimate coagulation.

*Example VIII*

To a fresh, unpreserved latex of total solids 39.6% was added 1% formaldehyde, 0.3% condensation product of formaldehyde with sodium naphthalene sulfonate, and 0.2% potassium hydroxide, all based on the latex.

To one sample of the thus treated latex was added 0.09% ammonium alginate based on the water content of the latex. The latex as thus ready for creaming had a 34.3% solids concentration, a pH of 8.6, and a dilution of each part of the original serum with 0.3 part of water by virtue of the water accompanying the various additions.

A second sample of the thus treated latex was diluted to 25.1% solids concentration, showing a dilution of each part of the original serum with one part of water. Ammonium alginate, and additional formaldehyde, and condensation product of formaldehyde with sodium naphthalene sulfonate were mixed with the water of dilution so as to keep their concentrations in the diluted serum the same as in the serum of the first sample. Addition potassium hydroxide was added with the water of dilution to give a pH of the diluted latex at 25.1% solids content of 8.5.

The two samples were allowed to cream for 20 days. The cream of the first sample had 57.3% solids concentration and a viscosity of 127 centipoises. The cream of the second sample had 57.5% solids concentration, and a viscosity of only 85 centipoises, showing a much lower viscosity of the cream for the second diluted sample than of the cream from the first sample.

*Example IX*

To a fresh, unpreserved latex of total solids 39.6% was added 0.2% formaldehyde, and 0.3% condensation product of formaldehyde and sodium naphthalene sulfonate based on the latex.

One sample of the above treated latex was creamed from a 27.5% solids content for 2 days with 0.09% ammonium alginate based on the water phase. This dilution of the original serum was 0.8 part of water for each part of original serum. The concentration of the cream was 55.9% at the end of two days. The cream was then separated and diluted to 30.8%, thus making the dilution of the original serum with 4 parts of water for each part of original serum. The formaldehyde content was adjusted to 1.5% on the water content of the diluted latex, the pH was adjusted to 8.1 with potassium hydroxide, and the ammonium alginate content was adjusted to 0.09% based on the water content of the diluted latex. The thus diluted latex was allowed to cream for an additional 18 days, making a 20 day creaming period in all.

Another sample of the above treated latex was creamed from a 33.2% solids content for a twenty day period with 0.09% ammonium alginate based on the water phase and with the formaldehyde content adjusted to 1.5% based on the water phase, and with potassium hydroxide addition to a pH of 8.1. The dilution of the original serum was 0.3 part of water for each part of original serum.

At the end of the twenty day creaming period, the solids concentration of the first cream sample where the serum had been diluted with four parts of water for each part of serum was 59.4% and the viscosity was 53 centipoises, whereas the solids concentration of the second cream sample where the serum had been diluted with only 0.3 part of water per part of serum was 59.1%, but the viscosity of this second cream sample was 119 centipoises, much higher than the first cream sample. On standing 79 days, the viscosity of the first cream where the latex had been diluted during the creaming was 54 centipoises, whereas the viscosity of the second cream had increased to 143 centipoises. On standing a further 17 days, the viscosity of the first cream from the diluted latex was 44 centipoises, whereas the second cream had become an unstable paste of too high a viscosity to be measured.

*Example X*

The following example shows that various anionic surface-active sulfates and sulfonates, other than the condensation product of formaldehyde with an alkali-metal aryl sulfonate, will not give the improvements of the present invention in creaming a formaldehyde treated latex.

In each of the following experiments fresh latex was preserved with 0.2% formaldehyde containing various amounts of different surface-active agents from 0.02% to 0.2% based on the latex. After ageing 22 hours, each sample was ammoniated to 1.3% ammonia and creamed with 0.05% ammonium alginate, both based on the latex. Serum was drained after 2 days, and the 2 day cream was analyzed for total solids content. The results are shown in the following table:

| Latex Total Solids (%) at Start of Creaming | Total Solids (%) of Creams at Following Concentrations (%) of Designated Surface-active Agent | | | | | |
|---|---|---|---|---|---|---|
| | None | 0.02 | 0.05 | 0.10 | 0.15 | 0.20 |
| Sodium Lauryl Sulfate | | | | | | |
| 34.4 | 50.1 | 45.3 | 35.3 | 34.7 | 34.6 | 34.6 |
| Sodium Salt of Sulfonated Dioctyl Ester of Succinic Acid | | | | | | |
| 33.5 | 51.6 | 48.2 | 45.8 | coagulated | | |
| Sodium Salt of Sulfonated Alkyl Ester of Higher Fatty Acid | | | | | | |
| 32.3 | 49.4 | 49.1 | 48.1 | 46.8 | 45.2 | 42.5 |
| Sodium Isopropyl Naphthalene Sulfonate | | | | | | |
| 31.5 | 47.8 | 45.1 | 41.2 | coagulated | | |

This application is a continuation-in-part of my application Serial No. 48,920, filed September 11, 1948 now abandoned.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of concentrating natural Hevea rubber latex to over 50% rubber content which comprises adding to fresh natural Hevea rubber latex 0.05 to 1.% of formaldehyde, and 0.02 to 1% of a condensation product of formaldehyde with an alkali-metal salt of an aryl sulfonic acid, and 0.02 to 0.5% of a vegetable mucilage creaming agent, said percentages being based on the latex, allowing the thus treated latex to stand until it separates into a cream fraction of over 50% solids concentration and a serum fraction, and separating said cream and serum fractions from each other.

2. The method of concentrating natural Hevea rubber latex to over 50% rubber content which comprises adding to fresh natural Hevea rubber latex 0.05 to 1% of formaldehyde based on the latex, and 0.02 to 1% based on the latex of a condensation product of formaldehyde with an alkali-metal salt of an aryl sulfonic acid, thereafter, within three days of the formaldehyde addition, adding ammonia to raise the pH of the latex above 8 and adding 0.02 to 0.5% of a vegetable mucilage creaming agent based on the latex, allowing the thus treated latex to stand until it separates into cream and serum fractions, and separating said cream fraction of over 50% rubber content and a serum fraction from each other.

3. The method of treating natural Hevea rubber latex which comprises adding to fresh natural Hevea rubber latex 0.05 to 1% of formaldehyde, and 0.02 to 1% of a condensation product of formaldehyde with an alkali-metal salt of an aryl sulfonic acid, and 0.02 to 0.5% of a vegetable mucilage creaming agent, said percentages being based on the latex, diluting the latex with one to five parts by weight of water for each part of original serum, allowing the thus treated latex to stand until it separates into cream and serum fractions, separating said cream and serum fractions from each other.

4. The method of treating natural Hevea rubber latex which comprises adding to fresh natural Hevea rubber latex 0.05 to 1% of formaldehyde, and 0.02 to 1% of a condensation product of formaldehyde with sodium naphthalene sulfonate, and 0.02 to 0.5% of a vegetable mucilage creaming agent, said percentages being based on the latex, allowing the thus treated latex to stand until it separates into cream and serum fractions, and separating said cream and serum fractions from each other.

5. The method of treating natural Hevea rubber latex which comprises adding to fresh natural Hevea rubber latex 0.05 to 1% of formaldehyde based on the latex, and 0.02 to 1% based on the latex of a condensation product of formaldehyde with sodium naphthalene sulfonate, thereafter, within three days of the formaldehyde addition, adding ammonia to raise the pH of the latex above 8 and adding 0.02 to 0.5% of a vegetable mucilage creaming agent based on the latex, allowing the thus treated latex to stand until it separates into cream and serum fractions, and separating said cream and serum fractions from each other.

6. The method of treating natural Hevea rubber latex which comprises adding to fresh natural Hevea rubber latex 0.05 to 1% of formaldehyde, and 0.02 to 1% of a condensation product of formaldehyde with sodium naphthalene sulfonate, and 0.02 to 0.5% of a vegetable mucilage creaming agent, said percentages being based on the latex, diluting the latex with one to five parts by weight of water for each part of original serum, allowing the thus treated latex to stand until it separates into cream and serum fractions, separating said cream and serum fractions from each other.

7. A concentrated natural Hevea rubber latex of over 50% rubber content containing small amounts of a condensation product of formaldehyde with an alkali-metal salt of an aryl sulfonic acid and a vegetable mucilage creaming agent, the rubber of said latex containing a small amount of combined formaldehyde.

8. A concentrated natural Hevea rubber latex having a pH above 8 and containing small amounts of a condensation product of formaldehyde with an alkali-metal salt of an aryl sulfonic acid and a vegetable mucilage creaming agent, the rubber of said latex containing a small amount of combined formaldehyde.

9. A concentrated natural Hevea rubber latex containing small amounts of a condensation product of formaldehyde with sodium naphthalene sulfonate and a vegetable mucilage creaming agent, the rubber of said latex containing a small amount of combined formaldehyde.

10. A concentrated natural Hevea rubber latex having a pH above 8 and containing small amounts of a condensation product of formaldehyde with sodium naphthalene sulfonate and a vegetable mucilage creaming agent, the rubber of said latex containing a small amount of combined formaldehyde.

JOHN S. RUMBOLD.

REFERENCES CITED

The following references are of record in the file of this patent:

UNITED STATES PATENTS

| Number | Name | Date |
|---|---|---|
| 1,699,369 | McGavack et al. | Jan. 15, 1929 |
| 1,838,826 | Gunther | Dec. 29, 1931 |
| 1,872,161 | McGavack | Aug. 16, 1932 |
| 2,327,115 | Linscott et al. | Aug. 17, 1943 |